UNITED STATES PATENT OFFICE.

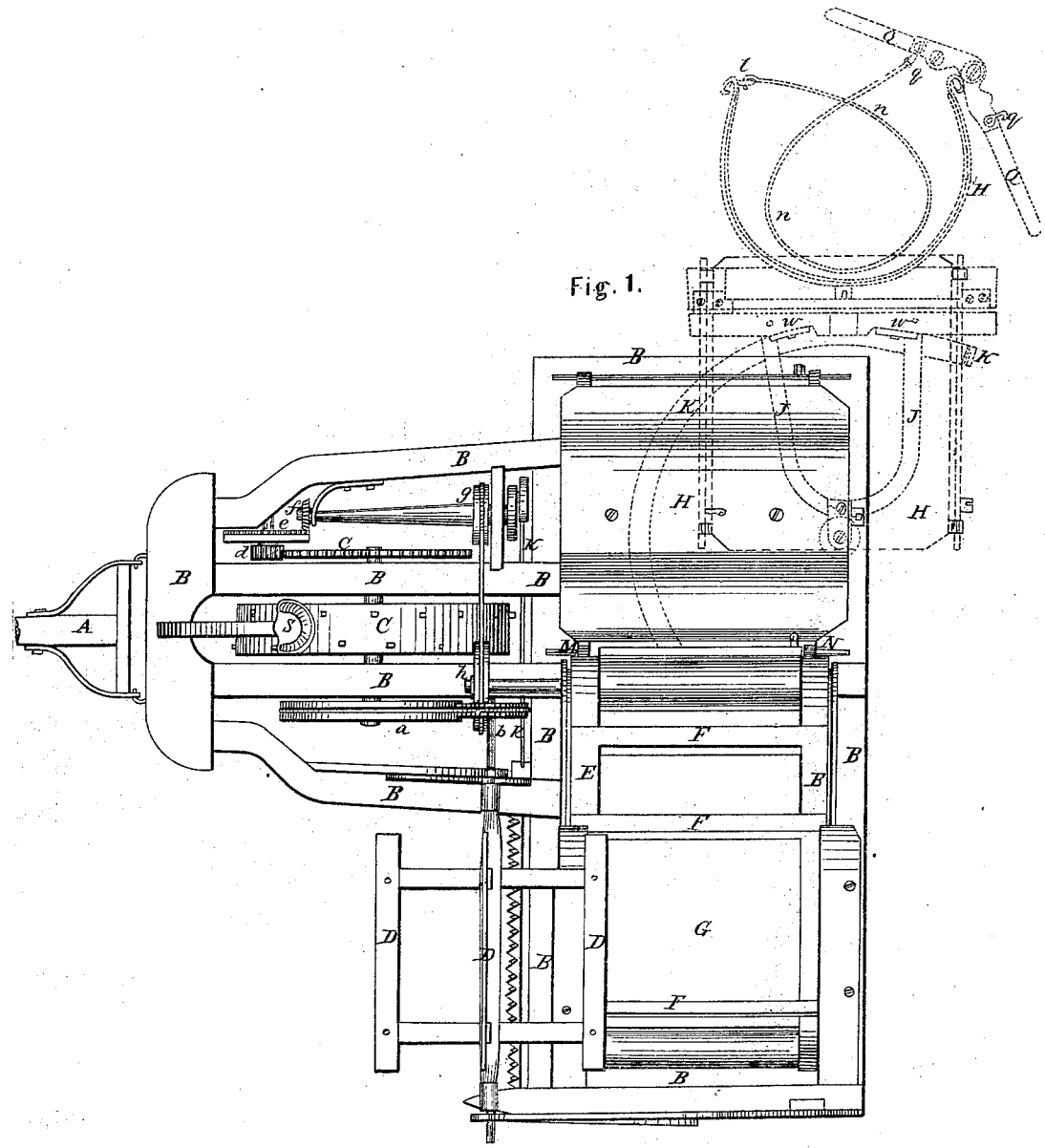

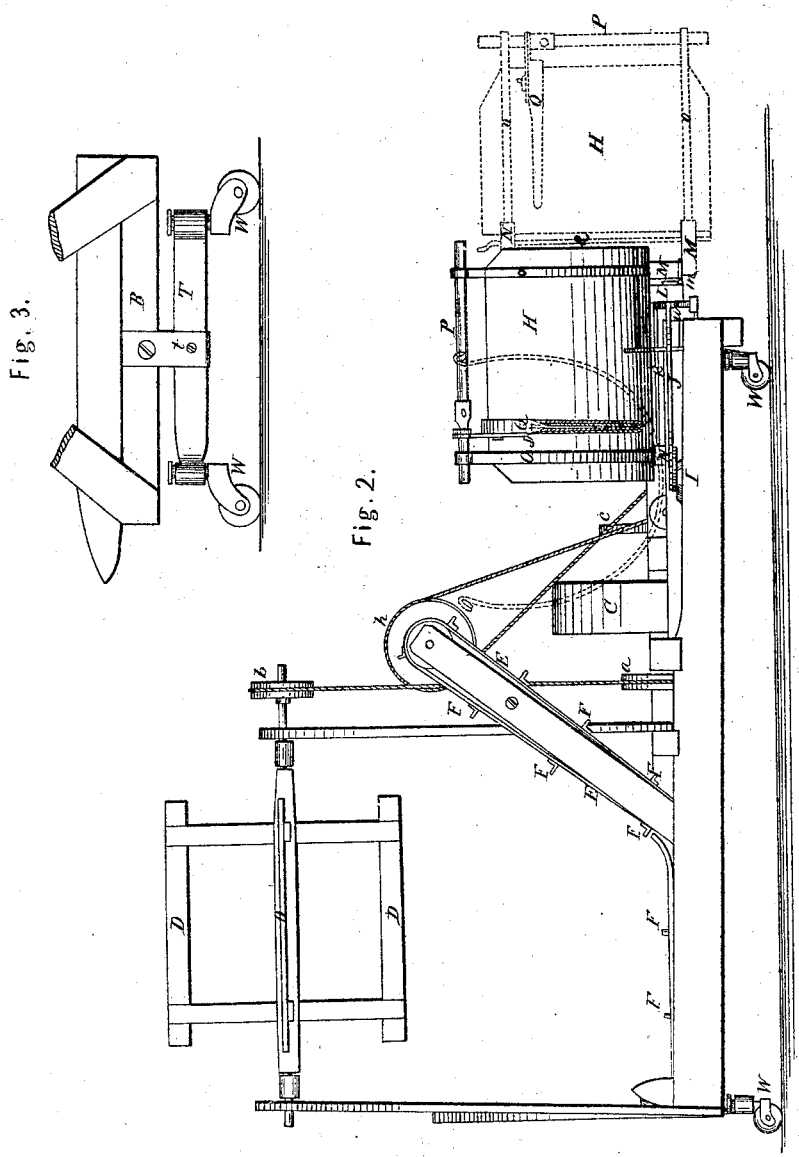

ROBERT B. LINTHICUM, OF LEXINGTON, ILLINOIS.

IMPROVEMENT IN CORN-HARVESTERS.

Specification forming part of Letters Patent No. 57,345, dated August 21, 1866.

*To all whom it may concern:*

Be it known that I, ROBERT B. LINTHICUM, of the city of Lexington, in the county of Mc-Lean and State of Illinois, have invented a new and useful Improvement in Machines for Harvesting Corn; and I do hereby declare and make known that the following is a full, clear, and exact description of the same, reference being had to the accompanying drawings, and the letters and figures marked thereon, which form part of this specification.

My said invention consists in a novel mode of supporting and attaching to a machine for harvesting corn a device for shocking the corn, whereby the corn is delivered, properly arranged, from an endless conveyer into a suitable receptacle, and, when enough has accumulated to form a shock, the machine being stopped the said corn is properly bound, when, by a lateral swinging motion of said receptacle or shocker, the butt-ends of the corn are thrown around to one side of the machine, where, by a vertical adjustment of said shocker, the shock of corn is deposited upon the ground in a standing position, as desired, when the shocker is adjusted in its original position, the machine started forward, and the operation above described repeated.

My invention further consists in a novel arrangement to be used in connection with said shocker for the purpose of compressing the corn therein to facilitate the binding thereof, as aforesaid; and my said invention further consists in a novel mode of supporting the machine upon its wheels, whereby the sudden and violent vertical movements thereof occasioned by passing over rough or uneven ground is almost wholly obviated.

To enable those skilled in the art to understand how to construct and use my said invention, I will proceed to describe the same with particularity, making reference in so doing to the aforesaid drawings, in which—

Figure 1 represents a plan or top view of my invention; Fig. 2, a rear view of the same, and Fig. 3 a detached side view thereof, showing the mode of arranging the wheels as aforesaid.

Similar letters of reference in the different figures denote the same parts of my invention.

A represents the draft-pole, whereby the horses are attached to the machine, B indicating any suitable frame, and C the drive-wheel, which, by means of the drums $a\ b$ and the belt thereupon, operates the reel, and, by means of the gear-wheels $c\ d\ e\ f$ and the drums $g\ h$, with their belt, operates the endless conveyer, and, by means of said gear-wheels and a suitable crank-wheel and the pitman $k$, operates the sickle or cutters.

D represents the reel aforesaid, and E F the said endless conveyer, consisting of two belts, E E, with buckets F attached thereto, which rake the corn from the stationary platform G, upon which it falls, thus insuring the adjustment of the corn properly upon the conveyer, so that the stalks shall be delivered parallel into the shocker H, hereinafter described.

In Fig. 1 the shocker is represented, in full lines, in the proper position to receive the corn from the conveyer; in dotted lines, when turned around ready to deposit the shock upon the ground, and in red lines, when turned or tipped up so as to set the shock upon the ground as desired.

In Fig. 2 the shocker is represented by dotted lines in the first position, by full lines in the second position, and by red lines in the third position.

The said shocker consists of a semi-cylindrical receptacle made of any suitable material, supported upon or in the curved arms marked O, and securely attached thereto. Beneath said shock-receiver the arms O are connected by a bar of iron or other suitable material, marked R.

The shock-receiver is supported and operated upon the following-described arrangement of parts, or their equivalents for effecting the same purposes:

J represents a curved bar or arm, pivoted in any suitable manner at I, each end thereof being supported upon suitable wheels or rollers, marked $w$, which move upon the curved track beneath the shocker H, (marked K,) which is supported upon the frame B in any suitable manner. Across the ends of said curved arm J is attached a beam or bar, marked L, as shown, and beneath each end of the said shocker and attached thereto are the cross-beams or sills, marked M N, respectively, as shown. The sill M is hinged to the aforesaid cross-bar L at $m$ while the sill N rests upon the arms J when the shocker is in a horizontal position.

From this arrangement it is evident that the shocking attachment may be readily moved around from the position in which it receives the corn from the conveyer to the position shown by the dotted lines in Fig. 1 and the full dark lines in Fig. 2, or vice versa, the supporting-wheels $w$ at one end moving around upon the aforesaid track K, and the whole attachment turning upon the pivot at I. It is also evident that by raising up the shock-receiver H the hinges $m$ will allow the same to assume the position shown by the red lines.

Q represents a lever or arm pivoted at one end to one side of the shock-receiver in any suitable manner, and provided with a hook, marked $q$, as shown. There is also a similar hook or other suitable device, marked $l$, upon the opposite side of said shock-receiver. The object of these last-described devices is to compress the corn in the shocker when enough has been received for a shock, to facilitate the binding of the shock.

In Fig. 3 is represented the manner in which the wheels are arranged beneath the machine, being attached, as shown, to the ends of a vibrating arm, marked T, which supports the frame at the single point $t$. By this arrangement, in addition to the advantages heretofore mentioned, the machine is balanced in such a manner as to preserve a horizontal position, notwithstanding the wheels may be elevated in front or rear by inequalities in the ground or field.

Having described the construction of my invention, I will now proceed to describe its operation.

The corn, upon being cut, falls back upon the aforesaid platform G, and is then gathered and properly arranged upon the conveyer by the buckets F, and so carried up and dropped into the shocker H. When enough corn has been deposited therein to form a shock the machine is stopped. At the commencement, however, and before any corn is deposited in the shocker, a cord, $n$, of suitable length and strength, is arranged within the shocker, the end represented as being attached to the hook $q$ lying over the opposite edge of the shocker, and the end attached to the hook $l$ lying over the edge of the shocker upon which the arm Q is arranged. Enough corn having been received to form a shock, as aforesaid, the compressing-cord $n$ is hooked, by suitable attachments, in the manner indicated in Fig. 1, when, by bringing the lever Q over into the position shown by the full red lines in Fig. 1, the corn in the shocker is compactly gathered together, when the twine or its equivalent may easily be adjusted around the shock and the binding thereof accomplished. The operator then swings the shocker around to the position indicated by the full dark lines in Fig. 2, and raises up the free end thereof until it assumes the position indicated by the red lines, which deposits the shock upon the ground in the proper upright position, as desired. The shocker is then returned to its original position, the compressing-cord is re-arranged, and the machine moves forward to repeat the operation.

If preferred, the shock may be set upon the ground before binding.

Instead of constructing the carriage of the shocker so as to provide for the vertical adjustment, the shock itself may be raised up and set down upon the ground by the operator without such vertical movement of the shocker; and by arranging the conveyer so as to form a rear delivery the shocker could be arranged so as to obviate the necessity of the horizontal motion, having simply the vertical movement to discharge and set up the shock.

Having described the construction and operation of my invention, I will now specify what I claim and desire to secure by Letters Patent—

1. The combination of the curved arm J, cross-bar L, wheels $m$, shock-receiver H, and curved track K, arranged and operating substantially as shown and described.

2. In combination with a shock-receiver, H, the employment of lever Q, with the hooks $l$ and $q$, and the compressing-cord $n$, as and for the purposes specified.

3. The arrangement of the pivoted wheels W and vibrating bar T with the frame B of a harvesting-machine, as and for the purposes set forth.

R. B. LINTHICUM.

Witnesses:
  GEO. CAMPBELL,
  W. E. MAUS.